Ernst Huber
INVENTOR.

United States Patent Office 3,429,560
Patented Feb. 25, 1969

3,429,560
DEVICE FOR MIXING OR SURFACE-TREATING FLOWABLE GOODS
Ernst Huber, 30 Lagernstrasse, 8037 Zurich, Switzerland
Filed Nov. 28, 1967, Ser. No. 686,078
Claims priority, application Switzerland, Dec. 30, 1966, 18,880/66
U.S. Cl. 259—72                                10 Claims
Int. Cl. B01f 9/10; B02c 17/08; B24b 31/06

ABSTRACT OF THE DISCLOSURE

A treatment vessel in the form of a generally annular horizontal trough with overhanging outer peripheral wall, having one or more deflection points where the trough bends sharply at an angle of 90° or less, is oscillated with a progressive wave motion by being coupled with a vibrator having a continuously rotating, eccentrically loaded vertical shaft aligned with the geometrical center of the trough.

Specification

My present invention relates to a device for the treatment of flowable goods, i.e., for mixing such goods or for polishing, grinding, deburring or otherwise surface-treating them.

The general object of my invention is to provide a vessel for the mixing of liquid and/or comminuted materials, e.g., spherical or other solid bodies and an abrasive powder with or without a liquid vehicle therefor, in a manner insuring the most intense interaction and uniform distribution of all the constituents.

A more particular object is to provide means for carrying out such treatment in an upwardly open vessel whose contents are readily accessible even during operation yet which, if desired, may also be closed, e.g., in a vacuum-type manner to enable treatment of the mobile charge therein under reduced pressure.

I have found, in accordance with this invention, that the foregoing objects can be realized by means of a treatment vessel in the form of a generally annular horizontal trough having one or more deflection points at which the trough forms a sharp-angled bend, the trough being resiliently supported with freedom of horizontal and vertical motion and being oscillatable by means of an eccentrically loaded vertical shaft mechanically coupled with the trough and substantially centered with reference thereto, the shaft being provided with drive means for subjecting same to a unidirectional torque which imparts a continuous oscillation with a progressive wave motion in peripheral direction to a mobile charge in the trough. By virtue of this arrangement, the charge impinges directly upon the outer peripheral wall of the trough at each deflection point and undergoes a sharp reversal of motion which thoroughly intermixes its constituents. For this purpose it is desirable that, if the trough is upwardly open, its outer peripheral wall forms an overhang at least in the region of the deflection point or points; preferably, the overhang should extend over the entire periphery of the trough.

For optimum performance, the angle formed by the trough at each deflection point should be equal to or smaller than 90°. This requirement can be satisfied with a variety of trough configurations, such as loops or polygons, it being apparent that no regular polygon with more than four sides can be used.

The invention will be described in greater detail with reference to the accompanying drawing in which.

Figure 1:
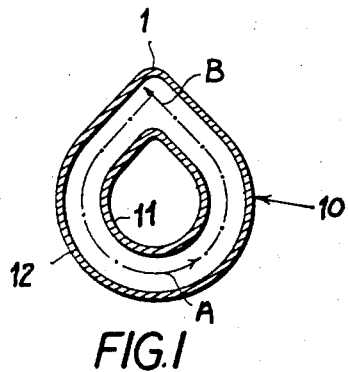
FIG. 1 is a horizontal cross-sectional view of a loop-shaped trough with a single deflection point, to be used in an apparatus according to the invention.

In FIG. 1 I have shown a treatment vessel 10 in the form of a generally annular but specifically loop-shaped trough having a deflection point at 1, both the inner and the outer peripheral wall 11 and 12 of the vessel being bent at 90° at that point. Thus, a mobile charge subjected to vibrations with a unidirectional peripheral component (arrow A) will impinge upon the outer wall 12 at point 1 (arrow B) and will undergo a sharp reversal of motion to intensify the interaction between its constituents and to distribute these constituents more uniformly throughout the vessel.

Figure 2:
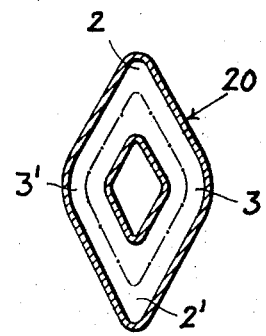
FIGS. 2 and 3 are views similar to FIG. 1, showing polygonal trough configurations.

FIG. 2 illustrates a four-sided trough 20 of rhombic shape having two sharp-angled corners 2, 2' and two obtuse corners 3, 3', only the former acting as deflection points within the context of the present invention.

Figure 3:
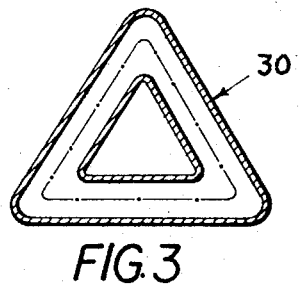

In FIG. 3 I have illustrated a triangular trough 30 having three deflection points of 60° each.

Figure 4:
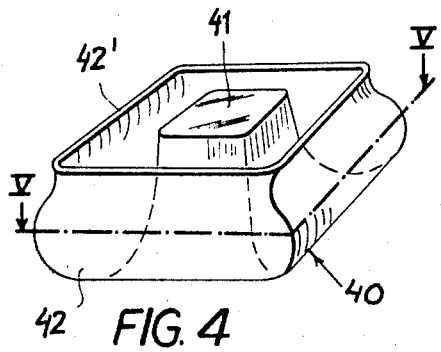
FIG. 4 is a perspective view of a trough of square shape.
Figure 6:
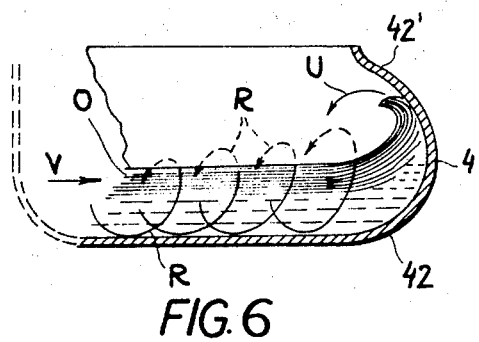
FIG. 6 is a fragmentary cross-sectional view taken on the line VI—VI of FIG. 5, drawn to a larger scale and illustrating diagrammatically the motion of a mobile charge in the trough.
Figure 5:
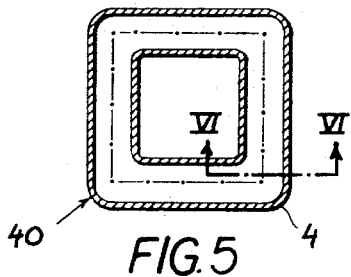
FIG. 5 is a sectional view similar to those of FIGS. 1–3 taken on the line V—V of FIG. 4.

FIGS. 4–6 show a trough 40 defined by a central boss 41 and an outer peripheral wall 42, the vessel being of square shape and being upwardly open although restricted by an overhang 42' of the peripheral wall 42. A charge O within the vessel 40 oscillates, as diagrammatically illustrated in FIG. 6, along a generally helicoidal path R with a unidirectional peripheral component V without, however, following completely the convolutions of the path R; this has been symbolized by the dotted-line portions of the helicoidal path, indicating the fact that the particles of the charge drop back to its overall level after only partly ascending the curved surface of the trough wall. At the deflection point 4, which is one of the four corners of the square, the motion of the particles is locally reversed, in a manner resembling the cresting of a wave, as illustrated by arrow U. This reversal not only results in a thorough intermingling of the components of charge O but also insures that the charge will not stagnate within the trough even if its character is that of a pasty mass not normally amenable to treatment in a vibratile vessel.

It will be understood that the vessels 10, 20, 30, shown in FIGS. 1–3 may have a cross-sectional shape similar to that of trough 40 or that, if desired, they may be more or less closed at the top. Any of these vessels may also be provided with a cover as illustrated in FIG. 7 described hereinafter.

Figure 7:
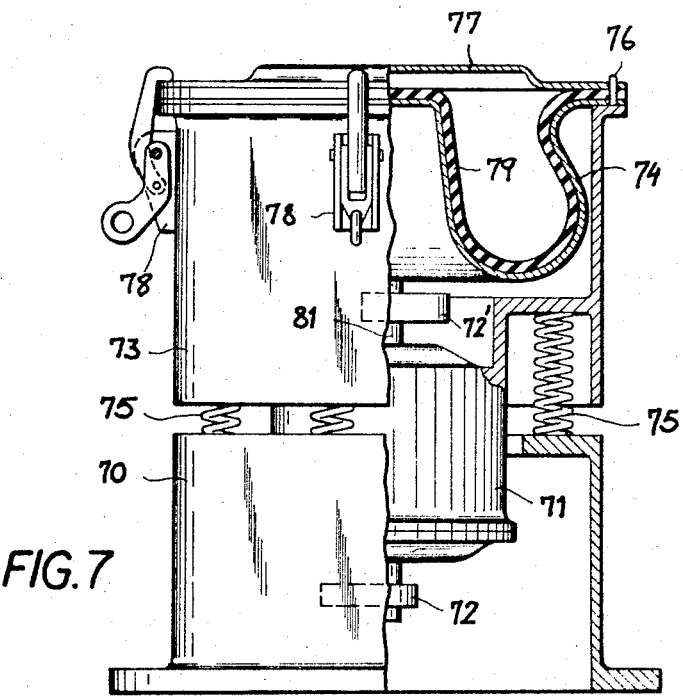
FIG. 7 is a side-elevational view, partly in section, of a device according to the invention incorporating a vessel similar to that shown in FIGS. 4–6.
Figure 8:
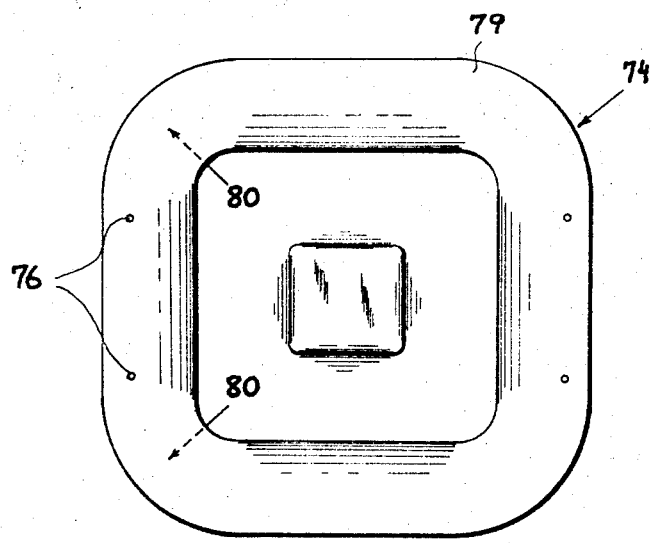
FIG. 8 is a top plan view of the vessel of FIG. 7.

FIGS. 7 and 8 show a vessel 74 which is generally similar to the trough 40 of FIGS. 4–6 and is supported on a base 70 through the intermediary of coil springs 75 so as to be movable in all horizontal directions and, to a more limited extent, also in vertical direction. Vessel 74 is removably seated in a frame 73 into which it is fitted by means of locator pins 76 that also pass through an associated cover 77. If the interior is to be evacuated, as is necessary for some types of treatment, the cover will, of course, have to be strong enough to withstand the atmospheric pressure. Toggle-type clamps 78 hold the cover 77 onto the vessel 74 during operation. The inside of the vessel is shown lined with an abrasion-resistant layer 79, e.g., of plastic material or natural rubber, to permit use of the device for grinding or polishing purposes.

Frame 73 is rigid with the housing of an electric motor 71 having a vertical shaft 81 centered on the axis of trough 74. Shaft 81 is loaded by a pair of eccentric weights 72, 72' which cause the entire mobile system 71, 73, 74 to wobble, the high-frequency vibrations being superimposed upon a relatively slow precession about the common center of gravity of the spring-supported parts. Shaft 81 is not directly connected with either the trough 74 or its frame 73 but transmits its oscillatory motion to the latter only through the intermediary of the motor 71. The four deflection points of trough 74 have been indicated at 80 in FIG. 8.

Figure 9:
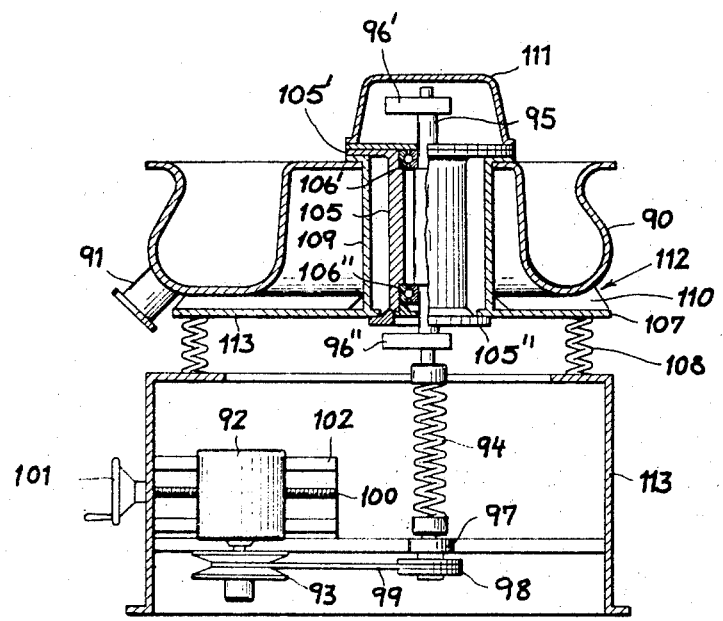
FIG. 9 is a sectional elevational view of a modified device according to the invention incorporating a vessel generally similar to that of FIG. 3.
Figure 10:
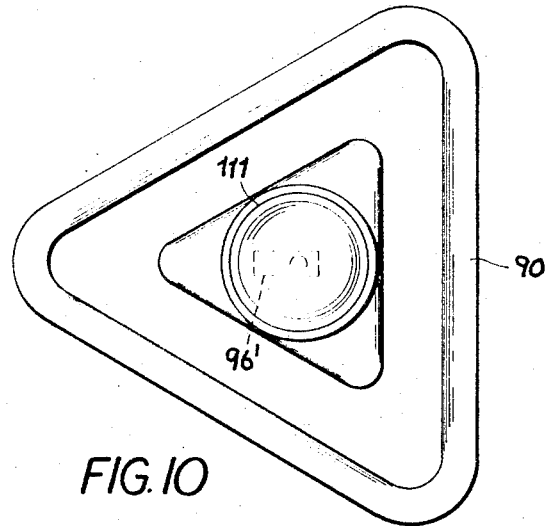
FIG. 10 is a top plan view of the vessel of FIG. 9.

Whereas the system of FIG. 7 is particularly suitable for smaller units, FIGS. 9 and 10 illustrate an alternate embodiment which may also be utilized for larger installations. This device has a trough 90 which, as best seen in FIG. 10, is of the same equilaterally triangular shape as the vessel 30 of FIG. 3. Trough 90, shown provided at 91 with a drain for the discharge of the treated material, is rigid with a platform 107 having a central tubular boss 109 to which a bearing sleeve 105 is secured by means of an upper flange 105' and a threadedly attached lower flange 105". Ball bearings 106' and 106" serve to journal a vertical shaft 95 within the sleeve 105, this shaft being eccentrically loaded by a pair of weights 96', 96" respectively positioned above and below the trough 90. A demountable lid 111 normally conceals the top of the shaft with its weight 96', removal of the lid 111 enabling adjustment of the angular position of this weight relative to weight 96" to vary the eccentricity of the shaft load and, with it, the amplitude of vibrations executed by vessel 90.

Platform 107, mounted by an array of coil springs 108 (only two shown) on a stationary base 113, is formed with a plurality of radially extending ribs 110 supporting the bottom and the inner peripheral wall of trough 90.

The drive for the shaft 95 includes a flexible link in the form of a rather stiff coil spring 94 which extends coaxially with the shaft and is anchored to the latter as well as to the hub of a sheave 98 which is journaled in a fixed bearing 97 and forms part of a transmission with adjustable speed ratio, this transmission including a split or Reeves-type pulley 93 and a V-belt 99. Pulley 93 is keyed to the output shaft of a drive motor 92 whose distance from the axis of sheave 98 can be varied by a radially extending leadscrew engaging a complementary nut (not shown) on the motor housing; the housing is slidably guided on rails 102 in order that the belt 99 may be held taut in different positions of adjustment of the Reeves pulley 93. By this means the vibrating frequency of the system can be varied in a continuous manner.

It will be understood that the vessels 74 and 90 may be given various shapes conforming with the principles of my invention, e.g., as illustrated in FIGS. 1–3, and that various modifications of the details of construction shown in FIGS. 7–10 are possible without departing from the spirit and scope of my invention as defined in the appended claims.

I claim:
1. A device for the treatment of flowable goods, comprising:
   a vessel in the shape of a generally annular horizontal trough having at least one deflection point whereat said trough forms a sharp-angled bend;
   mounting means resiliently supporting said trough with freedom of horizontal and vertical motion;
   and vibrator means including an eccentrically loaded vertical shaft substantially centered with reference to said trough and drive means for subjecting said shaft to a unidirectional torque, said shaft being mechanically coupled with said trough for imparting thereto a continuous oscillation with a progressive wave motion in peripheral direction whereby a mobile charge in said trough impinges upon the outer peripheral wall thereof at said deflection point.
2. A device as defined in claim 1 wherein said peripheral wall forms an overhang at least in the region of said deflection point.
3. A device as defined in claim 2 wherein said overhang extends over the entire periphery of said trough.
4. A device as defined in claim 1 wherein the angle formed by said trough at said deflection point is at most equal to 90°.
5. A device as defined in claim 1, further comprising a removable cover overlying said trough.
6. A device as defined in claim 1 wherein said shaft is provided with eccentric weight means of adjustable eccentricity.
7. A device as defined in claim 6 wherein said weight means comprises two eccentric weights movable into different relative angular positions on said shaft.
8. A device as defined in claim 1 wherein said drive means comprises a motor having a housing rigid with said trough, said shaft being mechanically connected with said trough by way of said housing only.
9. A device as defined in claim 1 wherein said mounting means includes a base, said drive means including a motor on said base and flexible link means coupling said motor with said shaft.
10. A device as defined in claim 9 wherein said link means includes a transmission of adjustable speed ratio and a coil spring coaxial with said shaft inserted between the latter and said transmission.

References Cited

UNITED STATES PATENTS

| | | | |
|---|---|---|---|
| 1,448,446 | 3/1923 | Hulbert | 259—72 |
| 3,100,088 | 8/1963 | Podmore et al. | 51—163 XR |

WALTER A. SCHEEL, *Primary Examiner.*

J. M. BELL, *Assistant Examiner.*

U.S. Cl. X.R.

51—163; 241—175